June 29, 1926.  
S. FORMAN  
1,590,968
DISPENSING CONTAINER
Filed Jan. 16, 1926
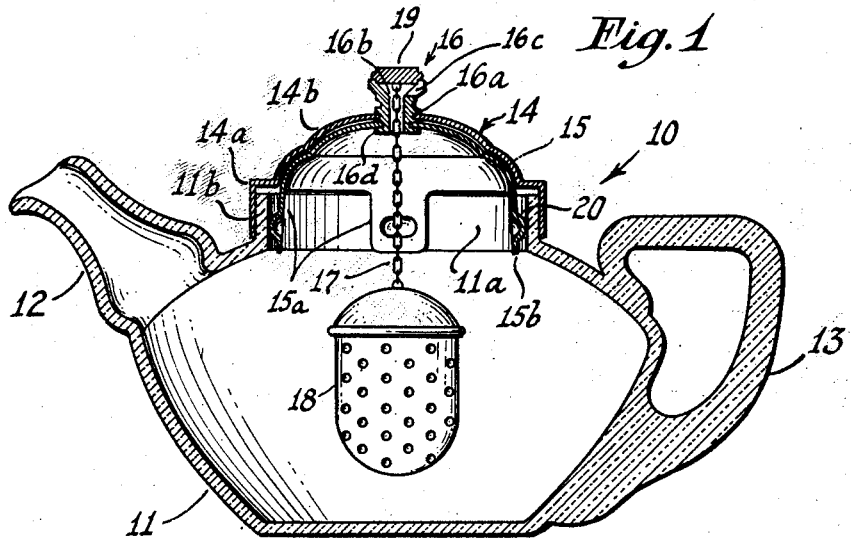
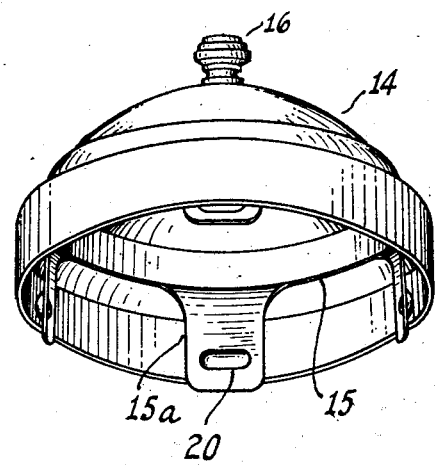
SOLOMON FORMAN  
INVENTOR
BY  
ATTORNEY Patented June 29, 1926.

1,590,968

UNITED STATES PATENT OFFICE.

SOLOMON FORMAN, OF NEW YORK, N. Y.

DISPENSING CONTAINER.

Application filed January 16, 1926. Serial No. 81,673.

This invention relates to liquid dispensing containers such as tea-pots and the like articles.

An object of the invention is to provide a sanitary container of the character described having a demountable cover or lid of improved construction which is mounted so as to permit ready removal thereof so that the parts may be easily and conveniently cleansed.

Another object of the invention is to provide an improved covered container of the character described, which comprises few and simple parts, which is neat and handy, inexpensive to manufacture, and practical to a high degree.

Other objects of this invention will in part be obvious and in part hereinafter pointed out.

With the above exception the invention accordingly consists in the features of construction, combinations of elements and arrangement of parts which will be exemplified in the construction hereinafter described, and of which the scope of application will be indicated in the following claims.

In the accompanying drawing, in which is shown one of the various possible illustrative embodiments of this invention, Fig. 1 is a cross-sectional view through an assembled tea pot embodying the invention; and Fig. 2 is a perspective view of the improved tea pot cover.

Referring in detail to the drawing, the liquid dispensing container embodying the invention here shown is a tea pot designated generally by numeral 10. 11 denotes the body of the tea pot which is preferably made of glass, porcelain or the like vitreous material and has formed integral therewith a spout 12 and a suitable handle 13. The body 11 may have a suitable top opening 11$^a$ bounded by an upstanding rim wall or neck 11$^b$ on which is fitted over said opening a demountable cover or lid 14 of improved construction.

The lid 14 is preferably made of metal suitably ornamented and finished and may comprise an outer base ring or flange 14$^a$ formed integral with a dome shaped top 14$^b$, said flange being adapted to fit over the outer side of the neck 11$^b$ of said body.

Extending centrally up from the dome shaped top 14$^b$ and rigidly secured thereto in any suitable manner, as at 16$^a$, there is a knob 16. A suitable opening 16$^b$ is provided through said knob to permit passage of a chain 17 on the lower end of which a tea ball 18 is hung. To support the upper end of the chain 17, a button 19 is attached thereto which seats on knob 16 and a slot 16$^c$ may be provided in the latter for adjustably anchoring the chain therein so as to vary the level of the tea ball in the body 11.

Where the closure member for tea pots, coffee pots, and the like vessels having vitreous body portions is fitted loosely in the vessel, difficulty has been experienced in that in the use of the vessel, the closure member often drops out of the vessel with resulting breakage. On the other hand, where the closure member has been securely fastened to the body portion of the vessel as by cementing the base ring to the vessel, this has resulted in a construction which renders the vessel less easily cleansible, because the portions adjacent the cemented joints are not accessible and since the vitreous and metallic parts require different cleaning processes. This is particularly the case where the metallic closure is ornamented and finished with a gilt coating or a silver plating.

A dominant feature of the invention resides in the provision of an improved clamping means for demountably securing the lid 14 to the body 11 so as to permit overcoming the above described cleansing difficulty.

Said clamping means is seen to comprise a disc 15 preferably made of spring metal which may be substantially the same shape as the dome shaped top 14$^b$ and is secured against the inner side of the latter, being fastened in position in any suitable manner as at 16$^d$ to the inner end of the knob 16. The disc 15 is formed with a plurality of spring fingers 15$^a$ extending from the rim thereof and formed to lie in spaced relation to said lid flange 14$^a$ for clampingly engaging the inner side of the neck 11ᵇ of said body 11 to secure the lid to the body.

A protuberance 20 extending outwardly towards the flange 14ᵃ may be provided on each of the fingers 15ᵃ and the lower ends 15ᵇ of the latter may be made to project beyond the lower rim edges of the flange 14ᵃ so that the lid 14 may be easily and quickly centered in mounting same on the body.

To apply the lid 14 it is centered with opening 11ᵃ and neck 11ᵇ of the body 11 by inserting the projecting finger ends 15ᵇ into the opening 11ᵃ, and then the lid is gently pressed in position causing the protuberance to spring clamp the inner side of the neck as shown in Fig. 1. The lid 14 is readily dismounted by firmly holding the body 11 and exerting a pull on the lid.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. In a device of the character described, the combination of a liquid dispensing container having a top opening and a closure member demountably secured over the opening, said member comprising a flanged lid having a knob and a disc secured by said knob against the inner side of said lid, said disc carrying spring means for releasably clamping the member to the rim of said opening.

2. In a device of the character described, the combination of a liquid dispensing container having a top opening, and a closure member demountably secured over the opening, said member comprising a top, a rim flange formed integral with said top, said flange adapted to fit over the exterior side of the rim of said opening, and a disc secured to lie against the top, said disc having spaced spring fingers for releasably clamping with the interior side of the rim of said opening.

3. In a device of the character described, the combination of a liquid dispensing container having a top opening and a closure member demountably secured over the opening, said member comprising a top, a rim flange formed integral with said top, said flange adapted to fit over the exterior side of the rim of said opening, and a disc secured to lie against the top, said disc having spaced spring fingers formed to lie in spaced relation to said flange, and a protuberance on each of said fingers extending toward said flange for releasably clamp engaging the interior side of the rim of said opening.

4. In a device of the character described, the combination of a liquid dispensing container having a top opening and a closure member demountably secured over the opening, said member comprising a top, a rim flange formed integral with said top, said flange adapted to fit over the exterior side of the rim of said opening, and a disc secured to lie against the top, said disc having spaced spring fingers for releasably clamping with the interior side of the rim of said opening, the ends of said fingers extending beyond the rim edge of said flange to facilitate centering said member in mounting same.

5. In a device of the character described, the combination of a liquid dispensing container having a top opening and a closure member demountably secured over the opening, said member comprising a top, a rim flange formed integral with said top, said flange adapted to fit over the exterior side of the rim of said opening, and a disc secured to lie against the top, said disc having spaced spring fingers formed to lie in spaced relation to said flange, and a protuberance on each of said fingers extending toward said flange for releasably clamp engaging the interior side of the rim of said opening, the ends of said fingers being extending beyond the rim edge of said flange to facilitate mounting said member.

6. A sanitary liquid dispensing container comprising a vitreous body having an opening, an upstanding neck forming the rim of said opening, a demountable lid adapted to support a tea ball for covering said opening, said lid comprising a top, a flange extending about the rim of said top shaped to fit about the exterior side of said neck, and a disc secured to said lid top, said disc having spring fingers spaced from the flange for clamp engaging the interior side of the neck.

7. A sanitary liquid dispensing container comprising a vitreous body having an opening, an upstanding neck forming the rim of said opening, a demountable lid adapted to support a tea ball for covering said opening, said lid comprising a top, a flange extending about the rim of said top shaped to fit about the exterior side of said neck, and a disc secured to said lid top, said disc having spring fingers spaced from the flange for clamp engaging the interior side of the neck, the ends of said fingers being extended beyond the rim edge of the flange as and for the purpose described and specified.

8. A sanitary liquid dispensing container comprising a vitreous body having an opening, an upstanding neck forming the rim of said opening, a demountable lid adapted to support a tea ball for covering said opening, said lid comprising a top, a flange extending about the rim of said top shaped to fit about the exterior side of said neck, and a disc secured to said lid top, said disc having spring fingers and protuberances on each finger extending toward the flange for clamp engaging the interior side of the neck.

In testimony whereof I affix my signature.

SOLOMON FORMAN.